United States Patent [19]

Halcomb

[11] Patent Number: 4,492,607
[45] Date of Patent: Jan. 8, 1985

[54] METHOD FOR PRODUCING INTEGRALLY STIFFENED FIBER REINFORCED PLASTIC PANELS

[75] Inventor: Ronald G. Halcomb, Tulsa, Okla.

[73] Assignee: Rockwell International Corporation, El Segundo, Calif.

[21] Appl. No.: 468,101

[22] Filed: Feb. 22, 1983

[51] Int. Cl.³ .............................................. B29B 1/14
[52] U.S. Cl. .................................. 156/242; 156/247; 156/249; 156/293; 156/303.1
[58] Field of Search ................. 156/242, 227, 93, 231, 156/232, 244.12, 244.27, 245, 479, 307.1, 247, 249, 293, 303.1; 425/438; 264/102; 428/35

[56] References Cited

U.S. PATENT DOCUMENTS 2,172,466  9/1939  Edwardes .......................... 264/255
4,256,790  3/1981  Lackman ............................ 428/73
4,331,723  5/1982  Hamm ................................ 428/61

Primary Examiner—George F. Lesmes
Assistant Examiner—P. R. Schwartz
Attorney, Agent, or Firm—Charles T. Silberberg; Max Geldin

[57] ABSTRACT

A method for producing T-section integrally stiffened reinforced panels formed of parallel stringers or stiffeners having a T-section, formed of fiber reinforced resin, co-cured to a skin component to be reinforced, also formed of fiber reinforced resin, comprises first forming a rubber-like, e.g., silicone rubber, form block containing T-shaped grooves corresponding to the T-section stiffeners. Lay-ups in the form of fiber reinforced partially cured thermosetting resin T-shaped stiffeners are then forced into the grooves of the rubber-like form block in spaced parallel relation therein, and the center of the T-section stiffeners between the flanges thereof is filled with unidirectional tape comprised of fiber reinforced partially cured thermosetting resin. An outer skin formed of fiber reinforced partially cured thermosetting resin fabric is then placed over the rubber-like form block and the T-section stiffeners therein. A top plate is then applied over the outer skin and the entire assembly is vacuum bagged and cured under heat and pressure to co-cure the parallel lay-ups or stiffeners in the form of T-section reinforcements, to the outer skin, to provide a uniform unwarped integrally stiffened panel.

24 Claims, 11 Drawing Figures

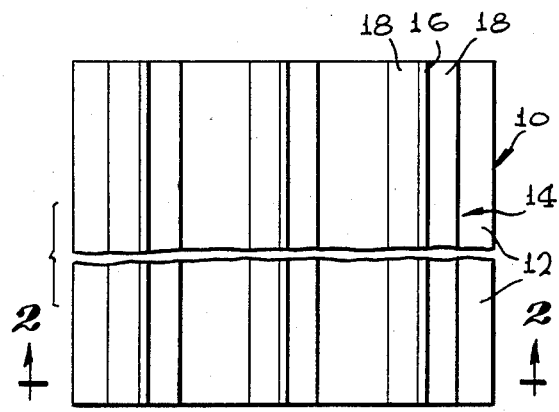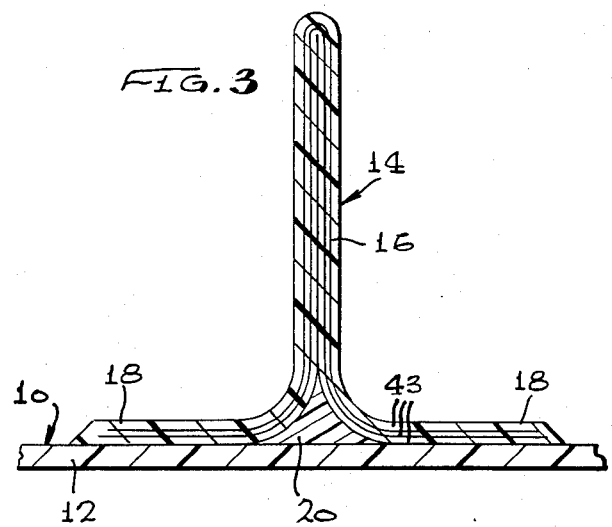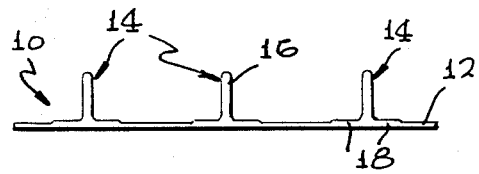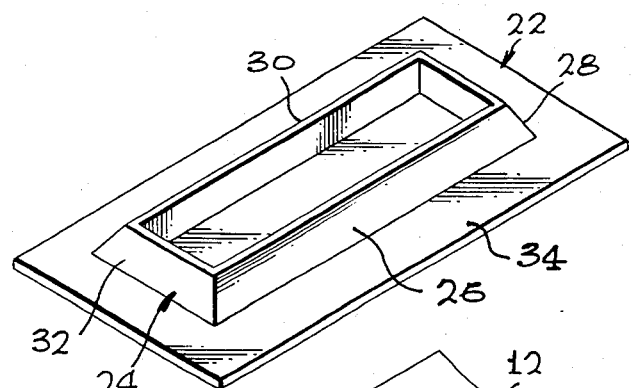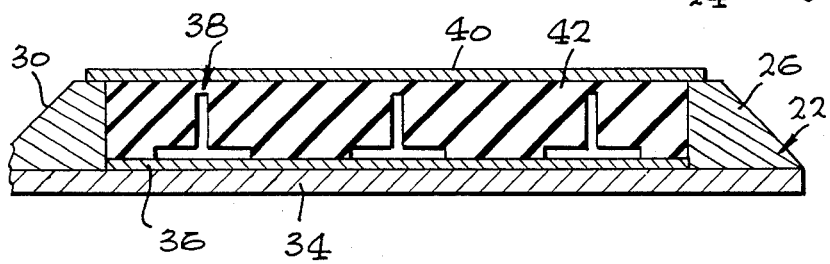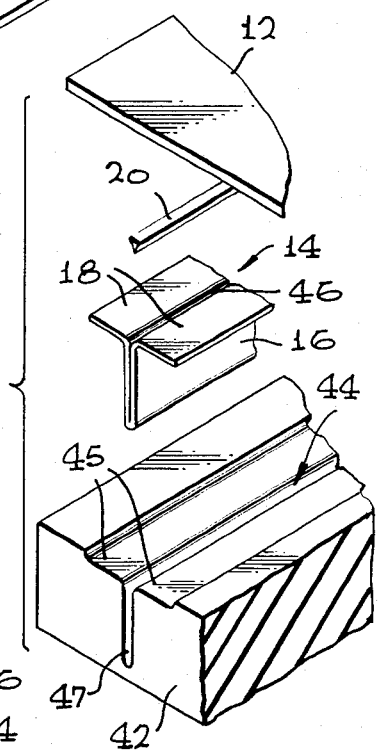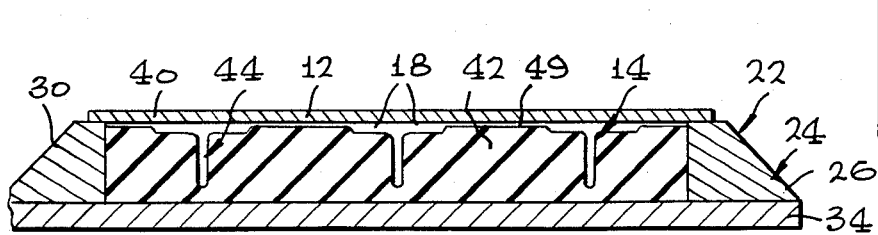

METHOD FOR PRODUCING INTEGRALLY STIFFENED FIBER REINFORCED PLASTIC PANELS

BACKGROUND OF THE INVENTION

This invention relates to the fabrication of composite structures, and is particularly directed to a method for producing integrally stiffened panels formed of fiber reinforced resinous or plastic materials such as tapes of graphite impregated with epoxy resin.

It is desirable particularly in the aircraft industry, to provide lightweight structural components which have good structural integrity at reduced cost. In many instances structural components especially for the aircraft industry are in the form of a detailed multiple aluminum structure. It is thus desirable to replace such structures with one-piece or integral composite assembly to simplify the fabrication procedure, while maintaining structural integrity and reducing weight, and also reducing the cost of fabrication. Various procedures heretofore have been developed for the production of composite structural components, for example formed from fiber reinforced resin impregnated fabrics or tapes. Thus, U.S. Pat. Nos. 3,926,708; 3,939,024; 3,946,127; 3,959,544; 3,995,080; and 4,012,549 are illustrative of the production of various fiber reinforced composite structures employing, for example, fiber reinforced resin impregnated tape in a lay-up procedure, and employing molds or die in fabricating the structure. U.S. Pat. Nos. 4,062,917 and 3,126,582 disclose a method of making resin-impregnated fabric materials employing a rubber-like mold. However, when producing composite structures by the use of encapsulated rubber, very high internal pressures are encountered, which squeeze excessive amounts of resin from a layup, rendering it too dry for structural acceptance. U.S. Pat. Nos. 4,051,289 and 4,223,053 illustrate interconnection of panel-like members or face sheets with stiffening ribs of V-shaped configuration.

It is an object of the present invention to provide improved procedure for the fabrication of integrally stiffened composite panels formed of fiber reinforced composite material.

Another object is the provision of procedure for fabricating a one-piece or integrally stiffened panel formed of T-shaped stringers or stiffeners integrally connected to an outer skin.

A still further object is to provide unique assembling and molding procedure in a die, including the initial production of a rubber-like form block in the die, and functioning as a means for maintaining in position a plurality of T-shaped stringers or stiffeners, and supporting an outer skin in contact with such stringers, for co-curing the stringers and outer skin to form an integrally stiffened panel.

Yet another object is the provision of molding procedure as noted above, whereby the high initial pressure generated in a partially encapsulated rubber mold during the heating and bonding cycle in an autoclave, can be suitably controlled.

SUMMARY OF THE INVENTION

The assembly produced according to the invention consists of a plurality of separate parallel stringers or stiffeners co-cured to an outer skin, both the stringers and outer skin being formed of fiber reinforced impregnated resinous material, such as graphite impregnated with epoxy resin, and forming a T-section integrally stiffened composite or panel.

In the fabrication procedure, a lay-up die is produced by positioning an outer frame on a base plate, the outer frame, for example, being of rectangular shape. After the lay-up die is assembled, a wax build up or layer is provided within the frame at the bottom of the die against the base plate, such wax layer simulating the skin of the stiffened panel to be produced, and having a thickness approximately equal to the thickness of such skin. A plurality of metal, e.g. aluminum, T-sections machined to simulate the stringers or stiffeners of the integrally stiffened panel to be produced, are positioned in spaced parallel relation on top of the wax layer. This mock-up is then employed to make a form block by pouring a rubber-like material such as the material marketed as Silastic "J" rubber, over the "mock-up", and the rubber-like material is then heat cured.

The cured rubber-like form block or mold is then removed from the die and the metal T-sections removed therefrom so that the form block now contains a plurality of grooves of a shape corresponding to the T-stiffeners. Stiffener lay-ups in the form of elongated members of T-shaped sections are produced by forming a laminate of a plurality of fiber reinforced resin impregnated tapes to provide a "pre-preg" which can be cured by further heating. Such T-shaped lay-ups functioning as stiffeners or stiffening ribs for the final composite panel are forced into the grooves of the rubber-like form block, as by means of a tooling aid, and the resulting assembly of the rubber-like form block containing the T-section stiffeners are introduced into the die and a fiber reinforced resinous fabric or skin also in the form of a "pre-preg", is positioned over the assembly in the die, and in contact with the flanges of the T-shaped stiffener members. A plate is then placed over the outer skin, and the entire assembly is then subjected to a conventional cure cycle in a autoclave, e.g. at 85 psi and 350° F., where the T-section lay-ups and the outer skin are comprised of tape or fabric formed of graphite fibers impregnated with an epoxy resin. Co-curing of the T-section stiffeners to the skin is accomplished during the curing cycle, forming a T-section integrally stiffened panel.

The present process involves, as a feature, encapsulating all but one free surface of the rubber-like mold in the die, using conventional metallic tooling, the remaining free surface of the mold being covered by a metallic plate and "vacuum bagged"in conventional manner to the metallic tooling or die. As the temperature rises during the bonding cycle in an autoclave, the rubber-like mold tends to relieve its internal pressure by exerting a force towards the free surface. This pressure is controlled and balanced by an equal and opposite pressure from the autoclave. When the rubber-like mold is at elevated temperature, it acts as a semi-fluid, transmitting to the T-section layups and the outer skin an even or uniform pressure on all surfaces.

The resulting integrally stiffened composite or panel has reduced weight as contrasted to composite structures formed of aluminum, and are particularly useful as a component in aircraft construction where high strength, high stiffness, high temperature resistance and low porosity properties are desired, as well as low weight. The resulting integrally stiffened panel produced according to the invention process maintains its structural integrity and is cost effective. Such integrally stiffened panels can be utilized for construction of missile interstages, floor panels, inner structure panels and other structures requiring a combination of a skin and integrally attached reinforcing stiffeners or stringers.

According to preferred practice, the invention accordingly resides in a process for producing an integrally stiffened panel comprising a skin of fiber reinforced resin containing T-section stiffeners of fiber reinforced resin, which comprise:

(a) producing a rubber-like form block having T-shaped grooves therein corresponding to the shape of said T-section stiffeners, (b) inserting T-section stiffeners of fiber reinforced partially cured thermosetting resin into the grooves of said form block, said T-section stiffeners comprising a leg and outwardly extending flanges, (c) introducing the resulting assembly of the form block and stiffeners into a die, (d) placing a sheet of fiber reinforced partially cured thermosetting resin forming a skin over said form block and in contact with the flanges of said T-section stiffeners, and (e) co-curing said stiffeners and said skin under heat and pressure to integrally connect said stiffeners to said skin.

Preferably the process also includes the step of inserting fiber reinforced partially cured thermosetting resin tape into the center space of said T-section stiffeners between the flanges thereof prior to said co-curing, and then co-curing the tape to said stiffeners and to said skin in step (e).

BRIEF DESCRIPTION OF THE DRAWINGS

The invention will be more clearly understood by reference to the detailed description below of certain preferred embodiments taken in conjunction with the accompanying drawings wherein:

FIG. 1 is a plan view of an integrally stiffened panel according to the invention, formed of a plurality of T-section stiffeners integrally connected to a skin;

FIG. 2 is a vertical transverse section taken on line 2—2 of FIG. 1;

FIG. 3 is an enlarged detail of FIG. 2, showing a stiffener or stringer integrally attached to the skin;

FIG. 4 is a plan perspective view of the lay-up die for producing the T-section integrally stiffened panel of FIGS. 1 and 2;

FIG. 5 illustrates the step for production of a rubber-like form block containing aluminum T-sections for the production of grooves in the form block into which the fiber reinforced T-stiffeners are to be incorporated;

FIG. 6 is an exploded view showing the form block produced in FIG. 5, the stiffener lay-ups which are to be introduced into the form block, the unidirectional tape used to fill the center of the T-section between the outwardly extending flanges thereof, and the skin to be reinforced and positioned over the form block and the stiffener lay-ups;

FIG. 7 is a vertical section showing the lay-up die tool containing the rubber-like form block, the T-section stiffeners positioned therein, the skin positioned over the form block and the stiffeners, and a top plate covering the assembly, for co-curing the stiffeners or stringers to the skin by heating in an autoclave;

DETAILED DESCRIPTION OF A PREFERRED EMBODIMENT

Figure 8:
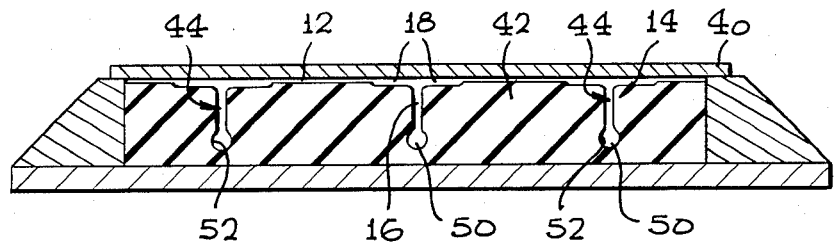
FIG. 8 is a view similar to FIG. 7, but wherein the T-section stiffeners are "bulbed" T-sections.

Referring FIGS. 1 to 3 of the drawing, the present invention is directed to production of a T-section integrally stiffened panel, indicated at 10, comprised of a skin in the form of a planar sheet 12 having integrally connected thereto, as by co-curing, a plurality of parallel spaced T-section stiffeners or stringers 14. Such stiffeners each have a vertical upstanding central portion or leg 16 and flanges 18 which are connected to the skin 12. A tape fill indicated at 20 fills the center of the T-section 14 between the adjacent inner ends of the flanges 18.

Referring now to FIGS. 4 and 5, a lay-up die indicated at 22 is provided by forming a dam or border 24 comprised of four detachable closeouts 26, 28, 30 and 32, connected to a base plate 34 and forming a rectangular "picture frame" die tool, as best seen in FIG. 4. A wax build up or layer 36 is formed at the bottom of the tool on the base plate 34, of a size (length and width) and thickness to simulate the skin 12 to which the parallel T-section stiffeners 14 are to be attached. Model T-sections, e.g. metal, such as aluminum, T-sections 38, of a size and shape machined to simulate the T-section stiffeners or stringers 14 are positioned in spaced parallel relation on top of the wax layer 36, in the same positions which are to be occupied by the stringers 14 on the skin 12. A rubber-like substance 42 in the form of a partially cured liquid thermosetting rubber composition such as a silicone rubber, e.g. the material marketed as Silastic "J", is then poured over the resulting "panel mock-up" or assembly within the die tool 22 and over the wax layer 36 therein, and filling the spaces above and between the aluminum T-sections 38. Instead of a silicone rubber, other curable liquid thermosetting compositions forming a rubber-like material on heating and curing, such as neoprene, can be used. A cover 40 is placed over the resulting asssemby and the liquid partially cured rubber-like material is cured by heating at high temperature of about 350° F. to produce a rubber form block 42 containing the aluminum T-sections 38.

The form block 42 with the aluminum T-sections 38 contained therein is removed from the lay-up die 22, together with the wax layer 36. The aluminum T-sections 38 are then removed from the form block 42, leaving spaced parallel grooves 44 in the form block, as seen in FIG. 6, having the T-section shape of the stiffeners or stringers 14 of FIGS. 1 to 3, which are to be attached to the skin 12, the flanges 45 of the T-shaped grooves 44 being at the top of the form block, with the leg 47 of such grooves extending vertically downward into the form block.

Referring again to FIG. 6, the stiffener lay-ups or stringers 14 to be inserted into the grooves 44 of the form block 42 are in the form of a fiber reinforced composite material such as graphite or boron, impregnated with a tough resinous polymer, which is preferably thermosetting, such as with an epoxy or epoxy novolac resin. The T-section stiffeners 14, referring particularly to FIG. 3, are fabricated by continuous lay-up and lamination of strips 43 of partially cured fiber reinforced resinous tapes of the above composition which are directionally oriented in each ply and a plurality of plies laminated in a predetermined relationship. Thus, each of such layers or plies can be in the form of a partially cured tape, known as a "pre-preg", and the layers or plies of such tape can be oriented in various directions such as 0°, 45° and 90°, to thus provide a material having high strength when finally cured. In such tapes the fibers also can be oriented at various angles to enhance strength.

The reinforcing T-sections or stringers 14 are made by folding a flat sheet of fiber reinforced resinous laminated material noted above in half to form a central vertical portion or leg 16 and bending the ends outwardly to form the flanges or shoulder 18 of the T-section. These symmetrical fiber reinforced T-sections or stringers 14 are then forced into the grooves 44 of the form block 42, preferably by means of a tool of blade-like configuration (not shown) to provide a plurality of spaced parallel T-sections 14 in the form block, as seen in FIG. 7, with the flanges 18 of the reinforcing T-sections 14 positioned at the top of the form block. A tape formed of a fiber reinforced impregnated partially cured resin such as a unidirectional partially cured graphite-epoxy "pre-preg" tape 20 is inserted into the center space 46 of the T-sections 14, between the flanges 18 thereof.

The assembly of the rubber form block 42 containing the T-section stiffeners 14 filled with the tape 20, is positioned in the lay-up die 22, as shown in FIG. 7, with the bottom of the form block 42 in contact with the base plate 34 of die 22. Such assembly is then compacted by "vacuum debulking", that is by placing a bag over the entire assembly and applying a vacuum. After compaction of the assembly of the form block containing the stiffeners 14 filled with tape 20, the bag is removed. While such compaction is preferred, in some cases it may be omitted.

The skin 12, in the form of a fabric comprised of a laminate or lay-up of a plurality of layers of a fiber reinforced material impregnated with a partially cured thermosetting resin such as a graphite-epoxy fabric, then is positioned over and in contact with the top surface 49 of the form block 42 in the die 22, and across and in contact with the flanges 18 of the T-section stiffeners or stringers 14. The layers of fabric impregnated with resin and forming the skin 12 also can be oriented in various directions, as in the case of the layers forming the T-section stiffeners. The layer or ply directions of the stringers or T-sections 14 as well as the skin 12 are arranged to provide optimum strength and stiffness. At the same time, symmetry is maintained within each lay-up of the stringers and skin to minimize panel warpage. The preferred material used for the stiffeners or stringers 14, unidirectional tape fill 20 and skin 12 is the material marketed as 934-T300 graphite-epoxy tape and fabric. The top plate 40 is then placed over the skin 12 and the resulting assembly is then vacuum bagged in the usual manner and subjected to a conventional cure cycle in an autoclave, e.g. at 85 psi and 350° F. The top plate 40 restrains the expansion of the rubber-like form block 42 to the extent of the autoclave pressure. This final curing operation co-cures the stiffeners or stringers 14 to the skin 12 to form a T-section integrally stiffened panel 10 according to the invention. Following final curing, the cover 40 is removed and the assembly including the form block 42 containing therein the cured panel 10 formed of the integral composite of the stringers 14, skin 12 and tape fill 20 is removed from the tool 22, and the stiffeners 14 are removed from the grooves 44 of the form block, together with the integrally attached skin 12 and tape fill 20.

Referring again to FIG. 7, the rubber-like block or mold 42, during heating and curing exerts an internal pressure or force towards its top surface 49 which is controlled by an equal and opposite pressure from the autoclave against the plate 40, so that after curing, the top surface of the block, the skin 12 and the flanges 18 of the T-section stiffeners 14 are even and uniform, with no "hump effect" of the top surface 49 of the form block 42 and no warping of the integrally stiffened panel. Although the arrangement shown in FIG. 7 is preferred, such arrangement can be reversed. Thus, the skin 12 can be placed in contact with the base plate 34 of the die 22, and the form block 42 reversed from its position shown in FIG. 7, with the flanges 18 of the stiffeners 14 in contact with the skin. The plate or cover 40 is then placed over the top surface of the reversed form block. Such an arrangement will operate satisfactorily if the plate 40 is sufficiently thick and heavy so that when the rubber-like form block expands during bonding and curing, the assembly is balanced in the autoclave and no "hump effect" occurs in the form block, and the resulting integrally stiffened panel remains upwarped.

The resulting T-section integrally stiffened panel 10 is a unitary composite assembly of high strength and stiffness, and of high-temperature resistance, and has low porosity and low weight properties. These properties and advantages render the process of the invention particularly useful for producing structural components having various applications particularly in aerospace and for aircraft, including utilization for missile interstages, floor panels, and inner structures, as well as in various other structures employing a skin/stringer design.

Figure 9:
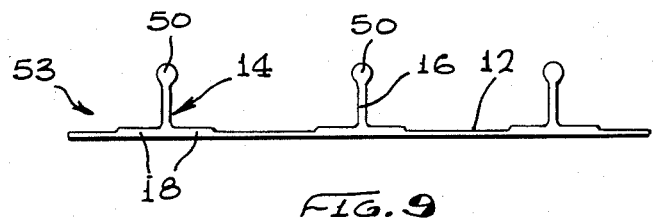
FIG. 9 is a vertical transverse section of the integrally stiffened panel produced in FIG. 8.

T-section stiffeners can be employed in the invention process wherein the central portion or leg 16 of such stiffeners can have a shape different from the straight leg 16 of the stiffeners 14 shown in FIGS. 2 and 3. Thus, as seen in FIGS. 8 and 9, the T-sections 14 can be bulbed T-sections wherein the leg 16 of such T-sections has a "bulb" 50 at its lower end opposite the flanges 18. In this modification the form block 42 is produced so that the T-section grooves 44 therein are of corresponding shape with the "bulbed" T-section stiffeners, and have a "bulb" 52 at the lower end of such T-section grooves. The resulting integrally stiffened panel including such stiffeners and skin 12 is shown at 53 in FIG. 9.

Figure 10:
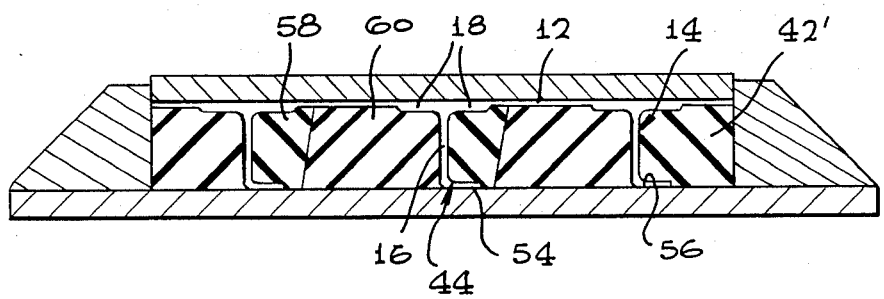
FIG. 10 is a view similar to FIG. 7, but wherein the T-section stiffeners have a hooked or J-section.
Figure 11:
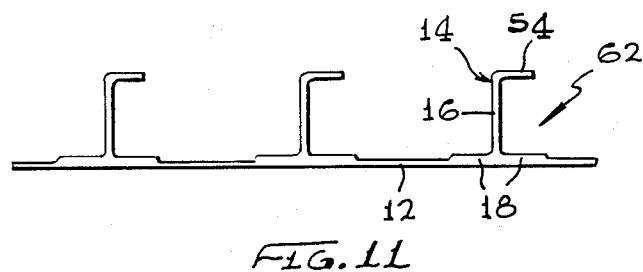
FIG. 11 is a vertical transverse section of the integrally stiffened panel produced in FIG. 10.

Further, referring to FIGS. 10 and 11, the T-section stiffeners 14 are shown having a central portion or leg 16 which is provided with a hook or "J" section 54 at its lower end opposite the flanges 18. In this embodiment, as shown in FIG. 10, the form block 42' is produced so that the T-section grooves 44 therein are of corresponding shape with the hooked T-section stiffeners of FIG. 10, and have a "hook" or "J" section 56 at the lower end of such T-section grooves.

The form block 42' in this embodiment is made up of separate sections 58 and 60 of suitable shape, alternately placed in side-by-side relation to form such grooves, and the T-section stiffeners with such "J" section are inserted into such grooves by assembling the sections 58 and 60. However, if desired, form block 42' can be a single unit as in the case of form block 42 of FIGS. 7 and 8. The resulting stiffened panel including such stiffeners and skin 12 is shown at 62 in FIG. 11.

From the foregoing, it is seen that the invention provides a novel and simple procedure for producing highly useful T-section integrally stiffened composites or panels especially useful in the aerospace and aircraft industry. Tests on the integrally stiffened panels produced by the invention procedure showed production of low porosity, high compaction and high strength panels or laminates. The resulting laminates were of low weight and had low warpage. Panels or laminates can be produced according to the invention having relatively high flatwise tension and high interlaminar shear properties, permitting production of integrally stiffened skin panels without mechanical attached fasteners. Such integrally stiffened panels have higher fatigue life without the use of fasteners. Further, various cross sections of stiffeners can be integrally co-cured to skins with relative ease and both longitudinal and transverse stiffeners can be integrally joined to the skin by the invention method. Finally, lower manufacturing costs are achieved by co-curing the stiffeners and skin according to the invention, employing fewer assembly tools and less assembly time.

Since various changes and modifications of the invention will occur to and can be made readily by those skilled in the art without departing from the invention concept, the invention is not to be taken as limited except by the scope of the appended claims.

I claim:

1. A process for producing an integrally stiffened panel comprising a skin of fiber reinforced resin containing T-section stiffeners of fiber reinforced resin, which comprises:
    (a) producing a rubber-like form block having T-shaped grooves therein corresponding to the shape of said T-section stiffeners,
    (b) inserting T-section stiffeners of fiber reinforced partially cured thermosetting resin into the grooves of said form block, said T-section stiffeners comprising a leg and outwardly extending flanges,
    (c) introducing the resulting assembly of the form block and stiffeners into a die,
    (d) placing a sheet of fiber reinforced partially cured thermosetting resin forming a skin over said form block and in contact with the flanges of said T-section stiffeners,
    (e) and co-curing said stiffeners and said skin under heat and pressure to integrally connect said stiffeners to said skin.

2. The process of claim 1, said T-shaped grooves in said form block being in spaced parallel relation and said T-section stiffeners being integrally connected to said skin in spaced parallel relation.

3. The process of claim 1, including the step of inserting fiber reinforced partially cured thermosetting resin tape into the center space of said T-section stiffeners between the flanges thereof prior to said co-curing, and then co-curing the said tape to said stiffeners and to said skin in step (e).

4. The process of claim 1, said T-section stiffeners being in the form of a lay-up comprising a plurality of fiber reinforced partially cured thermosetting resin tape layers.

5. The process of claim 4, said T-section stiffeners being formed by folding a flat sheet of said lay-up in half and bending the edges of said lay-up outwardly to form the flanges of said stiffeners.

6. The process of claim 1, wherein said T-section stiffeners are formed of layers of tape comprised of graphite or boron fibers, impregnated with partially cured epoxy or epoxy novolac resin, and said skin is formed of fabric comprised of graphite or boron fibers and partially cured epoxy or epoxy novolac resin.

7. The process of claim 6, including the step of inserting fiber reinforced partially cured thermosetting resin tape into the center space of said T-section stiffeners between the flanges thereof and co-curing the said tape to said stiffeners and to said skin in step (e).

8. A process for producing an integrally stiffened panel comprising a skin of fiber reinforced resin containing T-section stiffeners of fiber reinforced resin, which comprises:
    forming a wax layer on the bottom plate of a die having the approximate shape and thickness of said skin,
    positioning a plurality of model T-sections on said wax layer, said model T-sections having a leg and flanges of substantially the same size and shape as said T-section stiffeners, said flanges of said model T-sections being in contact with said wax layer,
    filling said die with a partially cured rubber-like thermosetting resin material and covering said model T-sections with said material,
    curing said thermosetting material to form a solid rubber-like resilient mass,
    removing said model T-sections from said rubber-like mass to form said form block containing said T-shaped grooves,
    inserting T-section stiffeners of fiber reinforced partially cured thermosetting resin into the grooves of said form block, said T-section stiffeners comprising a leg and outwardly extending flanges,
    introducing the resulting assembly of the form block and stiffeners into a die,
    placing a sheet of fiber reinforced partially cured thermosetting resin forming a skin over said form block and in contact with the flanges of said T-section stiffeners,
    and co-curing said stiffeners and said skin under heat and pressure to integrally connect said stiffeners to said skin.

9. The process of claim 8, said model T-sections being aluminum T-sections.

10. The process of claim 8, said partially cured rubber-like thermosetting resinous material being a partially cured silicone rubber material.

11. The process of claim 8, said T-shaped grooves in said form block being in spaced parallel relation and said T-section stiffeners being integrally connected to said skin in spaced parallel relation.

12. A process for producing an integrally stiffened panel comprising a skin of fiber reinforced thermosetting resin having integrally connected thereto on one surface thereof a plurality of spaced parallel T-section stiffeners of fiber reinforced resin, which comprises
    (a) producing a rubber-like form block having a plurality of spaced parallel T-shaped grooves therein corresponding to the shape of said T-section stiffeners,
    (b) inserting T-section stiffeners of fiber reinforced partially cured thermosetting resin into the grooves of said form block, said T-section stiffeners comprising a leg and outwardly extending flanges, said flanges being positioned at the top of said form block, said T-section stiffeners being in the form of a lay-up comprising a plurality of layers of a tape of graphite fibers impregnated with partially cured epoxy resin, (c) inserting unidirectional tape of graphite fibers impregnated with partially cured epoxy resin into the center space of said T-section stiffeners between the flanges thereof, to fill said center space, (d) introducing the resulting assembly of the form block, said stiffeners and said fill tape, into a die surrounding said form block, (e) placing a sheet of fabric comprised of fiber reinforced composite material impregnated with a partially cured thermosetting resin forming a skin, in contact with the top of said form block and the flanges of said T-section stiffeners, and (f) co-curing said T-section stiffeners, said unidirectional tape and said skin in an autoclave at a temperature sufficient to integrally connect said stiffeners and said unidirectional tape to said skin with said stiffeners in spaced parallel relation.

13. The process of claim 12, including compacting the assembly of said rubber-like form block containing said T-section stiffeners and said unidirectional fill tape prior to introducing said assembly into said die, and placing a top plate over said skin in the assembly in said die, and then introducing the resulting assembly into an autoclave and heating said assembly under pressure in said autoclave to produce said co-curing of said T-section stiffeners, said unidirectional fill tape and said skin.

14. The process of claim 12, wherein said skin is formed of fabric comprised of a plurality of layers of graphite fibers impregnated with partially cured epoxy resin.

15. The process of claim 12, wherein the layers of tape in the lay-up forming said T-section stiffeners are oriented in a plurality of directions.

16. The process of claim 14, wherein the layers of graphite fibers impregnated with epoxy resin forming said skin are oriented in a plurality of directions.

17. The process of claim 13, including initially producing said form block by (1) forming a wax layer on the bottom plate of a die having the approximate shape and thickness of said skin, (2) positioning a plurality of metal T-sections on said wax layer, said metal T-sections having a leg and flanges of substantially the same size and shape of said T-section stiffeners, said metal T-sections being located in spaced parallel relation on said wax layer with said flanges of said metal T-sections in contact with said wax layer, (3) pouring a liquid partially cured rubber-like thermosetting resinous material into said die to cover said metal T-sections with said liquid resinous material, (4) curing said resinous material to form a solid rubber-like resilient mass, and (5) removing said metal T-sections from said rubber-like mass to form said form block containing said T-shaped grooves in spaced parallel relation, with the flanges of said T-shaped grooves at the top of said form block and the leg of said grooves extending vertically downward into said form block.

18. The process of claim 17, said metal T-sections being aluminum and said liquid thermosetting resinous material being a partially cured silicone resin.

19. The process of claim 1, said die having an enclosed outer periphery and a base plate, the bottom of said form block being in contact with said base plate and including placing a top plate over said skin, vacuum bagging the resulting assembly, placing the vacuum bagged assembly in an autoclave, and carrying out said co-curing in step (e), the upward pressure exerted by said rubber-like form block during heating in said autoclave, being controlled and balanced by the autoclave pressure, whereby the skin and T-section stiffeners of the resulting integrally stiffened panel following co-curing are even and uniform.

20. The process of claim 1, the leg of said T-section stiffeners being straight.

21. The process of claim 1, the leg of said T-section stiffeners being bulbed at the end thereof opposite said flanges.

22. The process of claim 1, the leg of said T-section stiffeners having a "J" section at the end thereof opposite said flanges.

23. A process for producing an integrally stiffened panel comprising a skin of fiber reinforced resin containing T-section stiffeners of fiber reinforced resin, which comprises:

producing a rubber-like form block having T-shaped grooves therein corresponding to the shape of said T-section stiffeners, inserting T-section stiffeners of fiber reinforced partially cured thermosetting resin into the grooves of said form block, said T-section stiffeners comprising a leg and outwardly extending flanges, placing a sheet of fiber reinforced partially cured thermosetting resin forming a skin in contact with the flanges of said T-section stiffeners and with the adjacent surface of said form block, and subjecting the resulting assembly of the form block, stiffeners and skin to heat and pressure in a die to co-cure said stiffeners and said skin under conditions to balance the internal pressure generated in said rubber-like form block, whereby no "hump effect" of said form block occurs and the cured integrally stiffened panel is unwarped.

24. The process of claim 23, including the step of inserting fiber reinforced partially cured thermosetting resin tape into the center space of said T-section stiffeners between the flanges thereof prior to said co-curing, and then co-curing the said tape to said stiffeners and to said skin.

* * * * *